US012285003B1

(12) United States Patent
Armand (10) Patent No.: US 12,285,003 B1
(45) Date of Patent: Apr. 29, 2025

(54) SCENT DISPERSAL ASSEMBLY

(71) Applicant: Shane Armand, Mandeville, LA (US)

(72) Inventor: Shane Armand, Mandeville, LA (US)

(*) Notice: Subject to any disclaimer, the term of this patent is extended or adjusted under 35 U.S.C. 154(b) by 497 days.

(21) Appl. No.: 17/943,797

(22) Filed: Sep. 13, 2022

(51) Int. Cl.
*A01M 31/00* (2006.01)

(52) U.S. Cl.
CPC .................. *A01M 31/008* (2013.01)

(58) Field of Classification Search
CPC ............ A01M 31/008; A61L 9/12; A61L 9/04
USPC ....................................... 239/57–59
See application file for complete search history.

(56) References Cited

U.S. PATENT DOCUMENTS

| | | | | |
|---|---|---|---|---|
| 2,609,230 | A * | 9/1952 | Raleigh ..................... | A61L 9/14 239/47 |
| 2,738,224 | A * | 3/1956 | Turner et al. ............. | A61L 9/12 239/57 |
| 2,797,844 | A * | 7/1957 | Meek ..................... | B65D 85/00 220/8 |
| 3,123,303 | A * | 3/1964 | Dearling .................. | A47K 5/06 239/57 |
| 5,746,019 | A | 5/1998 | Fisher | |
| 6,050,551 | A * | 4/2000 | Anderson ............... | A61L 9/122 261/DIG. 65 |
| 6,158,668 | A | 12/2000 | Burgeson | |
| 6,241,161 | B1 | 6/2001 | Corbett | |
| 6,648,239 | B1 | 11/2003 | Myny et al. | |
| 7,843,735 | B2 | 11/2010 | Mast | |
| 2004/0050950 | A1 * | 3/2004 | Brown ................ | A01M 1/2055 239/57 |
| 2005/0029363 | A1 | 2/2005 | Brown | |
| 2017/0347642 | A1 | 12/2017 | Charles | |

* cited by examiner

*Primary Examiner* — Christopher S Kim
(74) *Attorney, Agent, or Firm* — R. Keith Harrison (57) ABSTRACT

A scent dispersal assembly may include an assembly container having a container interior. A scent containing insert may include a scent receptacle which is selectively deployable in a closed, sealing configuration in the container interior and extendable from the container interior of the assembly container to an open, scent dispensing-configuration. The scent receptacle may include a scent receptacle interior suitably sized and configured to contain at least one scent medium. At least one scent dispensing aperture may be provided in the scent receptacle. The dispensing aperture or apertures may communicate with the scent receptacle interior of the scent receptacle. An assembly cap may be deployable in a closed cap position to close and seal the scent receptacle interior and an open cap position to open the scent receptacle interior of the scent receptacle. A cap hinge may pivotally attach the assembly cap to the scent containing insert. The cap hinge may be configured to impart a first airtight seal between the scent containing insert and the assembly container in the closed, sealing configuration of the scent containing insert and a second airtight seal between the assembly cap and the scent containing insert in the closed cap position of the assembly cap. A hinge ring connector may connect the cap seal ring to the insert seal ring.

20 Claims, 11 Drawing Sheets

SCENT DISPERSAL ASSEMBLY

FIELD

Illustrative embodiments of the disclosure generally relate to devices for dispensing scents in the attraction of game animals. More particularly, illustrative embodiments of the disclosure relate to a scent dispersal assembly which is versatile, durable, and capable of containing a variety of scent media suitable for attracting game animals.

SUMMARY

Illustrative embodiments of the disclosure are generally directed to a scent dispersal assembly which is versatile, durable, and capable of containing a variety of scent media suitable for attracting game animals. An illustrative embodiment of the scent dispersal assembly may include an assembly container having a container interior. A scent containing insert may include a scent receptacle which is selectively deployable in a closed, sealing configuration in the container interior and extendable from the container interior of the assembly container to an open, scent dispensing-configuration. The scent receptacle may include a scent receptacle interior suitably sized and configured to contain at least one scent medium. At least one scent dispensing aperture may be provided in the scent receptacle. The dispensing aperture or apertures may communicate with the scent receptacle interior of the scent receptacle. An assembly cap may be deployable in a closed cap position to close and seal the scent receptacle interior and an open cap position to open the scent receptacle interior of the scent receptacle. A cap hinge may pivotally attach the assembly cap to the scent containing insert. The cap hinge may be configured to impart a first airtight seal between the scent containing insert and the assembly container in the closed, sealing configuration of the scent containing insert and a second airtight seal between the assembly cap and the scent containing insert in the closed cap position of the assembly cap. A hinge ring connector may connect the cap seal ring to the insert seal ring.

BRIEF DESCRIPTION OF THE DRAWINGS

Illustrative embodiments of the disclosure will now be described, by way of example, with reference to the accompanying drawings, in which.

DETAILED DESCRIPTION

Figure 1:
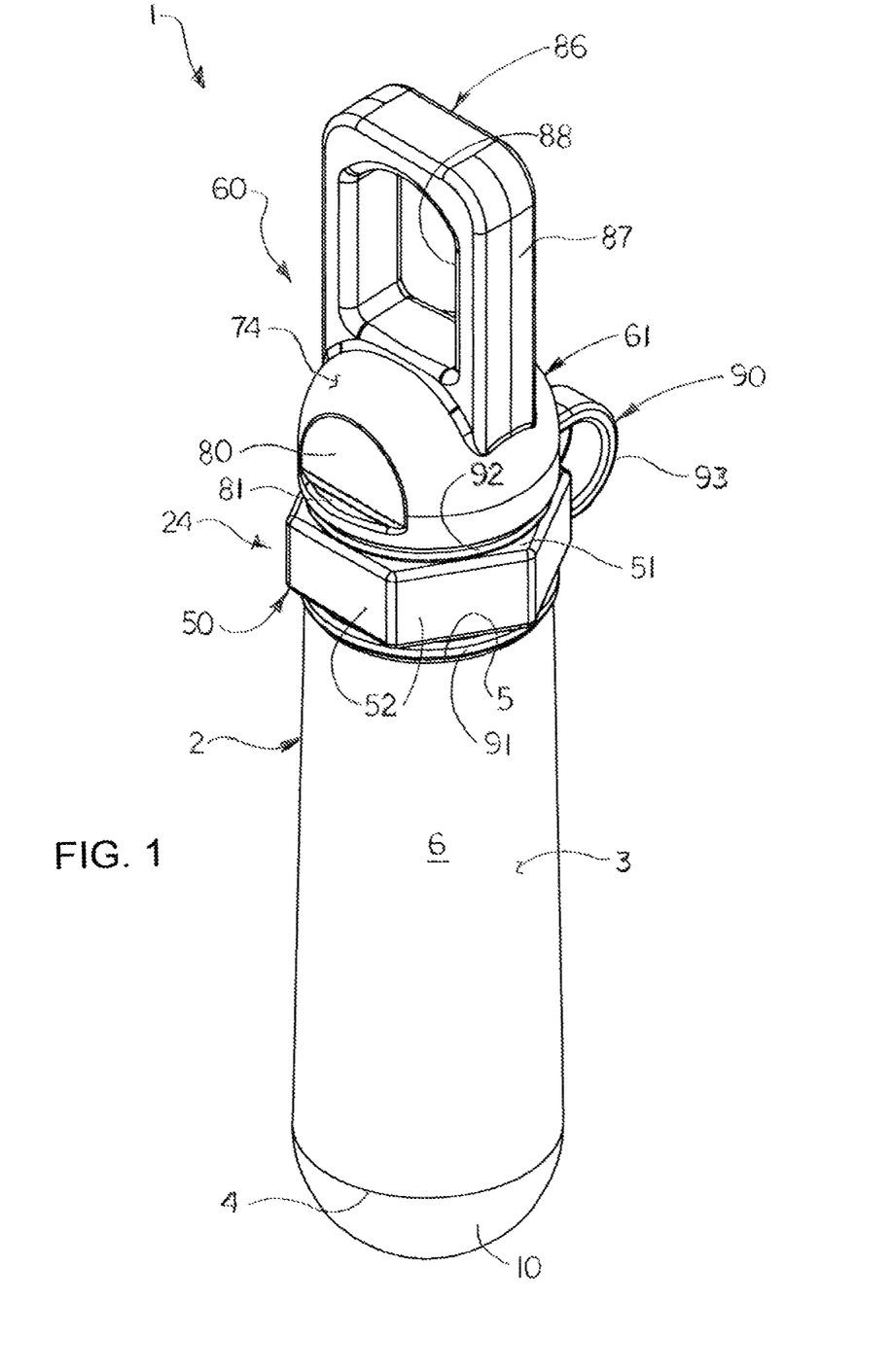
FIG. 1 is a front perspective view of an illustrative embodiment of the scent dispersal assembly, with the scent containing insert deployed in a closed, sealing configuration on the assembly container and the assembly cap deployed in a closed cap position on the scent containing insert.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front" "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 9:
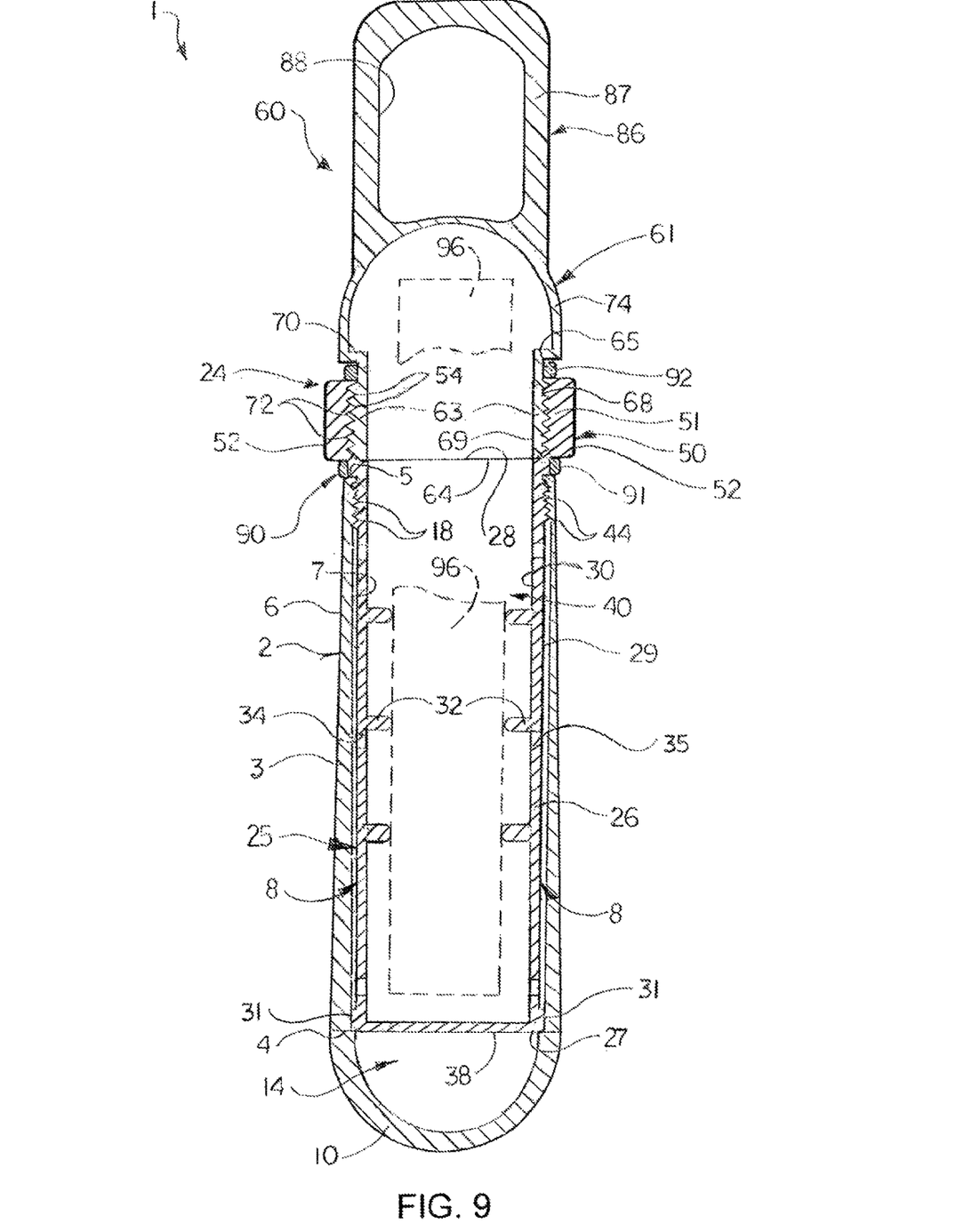
FIG. 9 is a longitudinal sectional view, taken along section lines 9-9 in FIG. 5, of the illustrative scent dispersal assembly, with a scent medium (illustrated in phantom) contained in the scent containing insert in typical application of the assembly.
Figure 12:
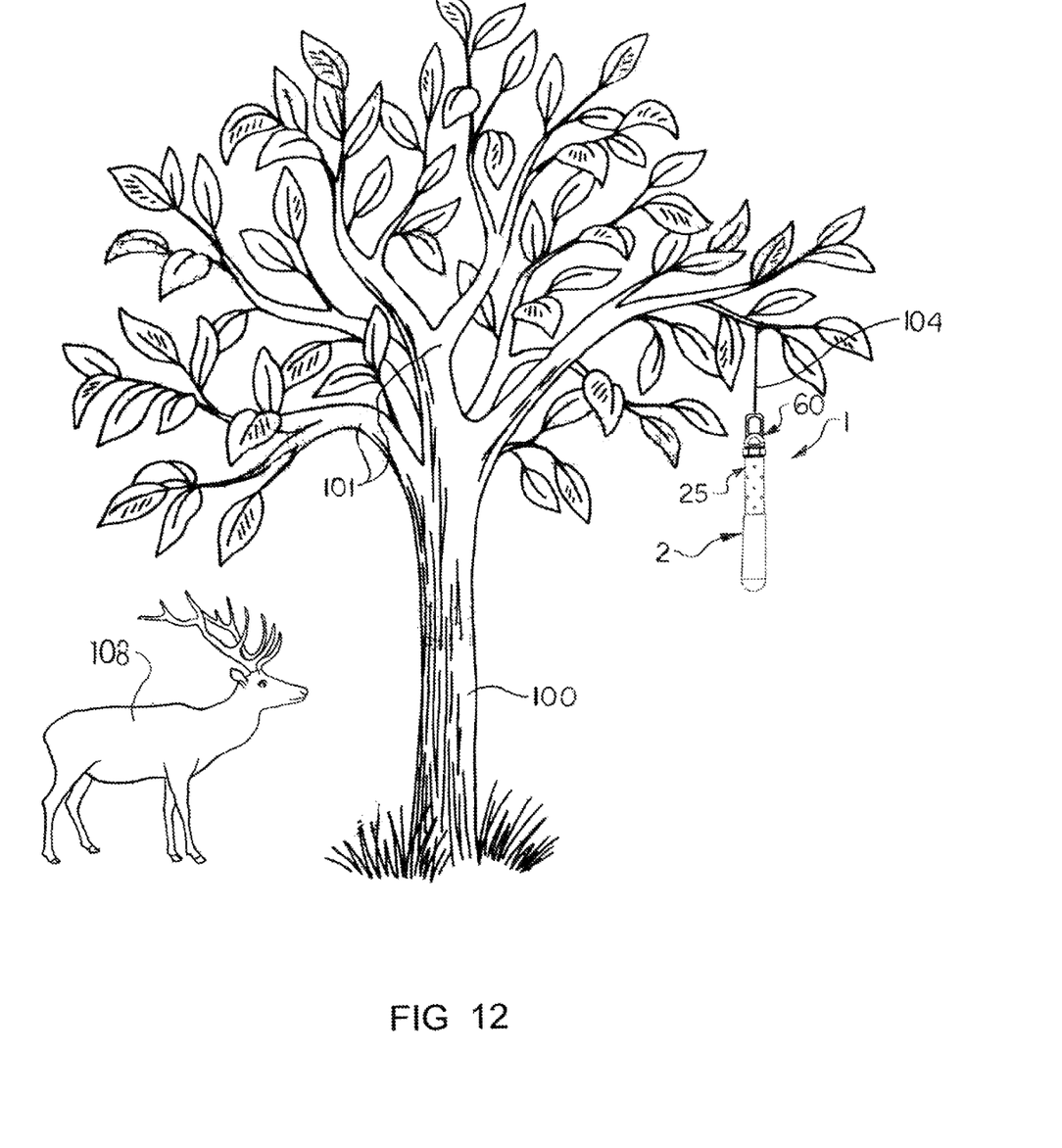
FIG. 12 is a front view of the illustrative scent dispersal assembly, suspended from a limb of a tree to attract game animals in typical application of the assembly.

Referring initially to FIGS. 9 and 12 of the drawings, an illustrative embodiment of the scent dispersal assembly is generally indicated by reference numeral 1. In typical application, which will be hereinafter described, at least one scent medium 96 (illustrated in phantom in FIG. 9) may be placed in the scent dispersal assembly 1. As illustrated in FIG. 12, the scent dispersal assembly 1, with the scent medium 96 contained therein, may be suspended from a limb 101 of a tree 100 or other support. One or more game-attracting scents may emanate from the scent medium 96 and waft from the scent dispersal assembly 1 to the area around the scent dispersal assembly 1 to attract game animals 108 to the scent dispersal assembly 1 for hunting, observation, and/or other purposes.

Figure 2:
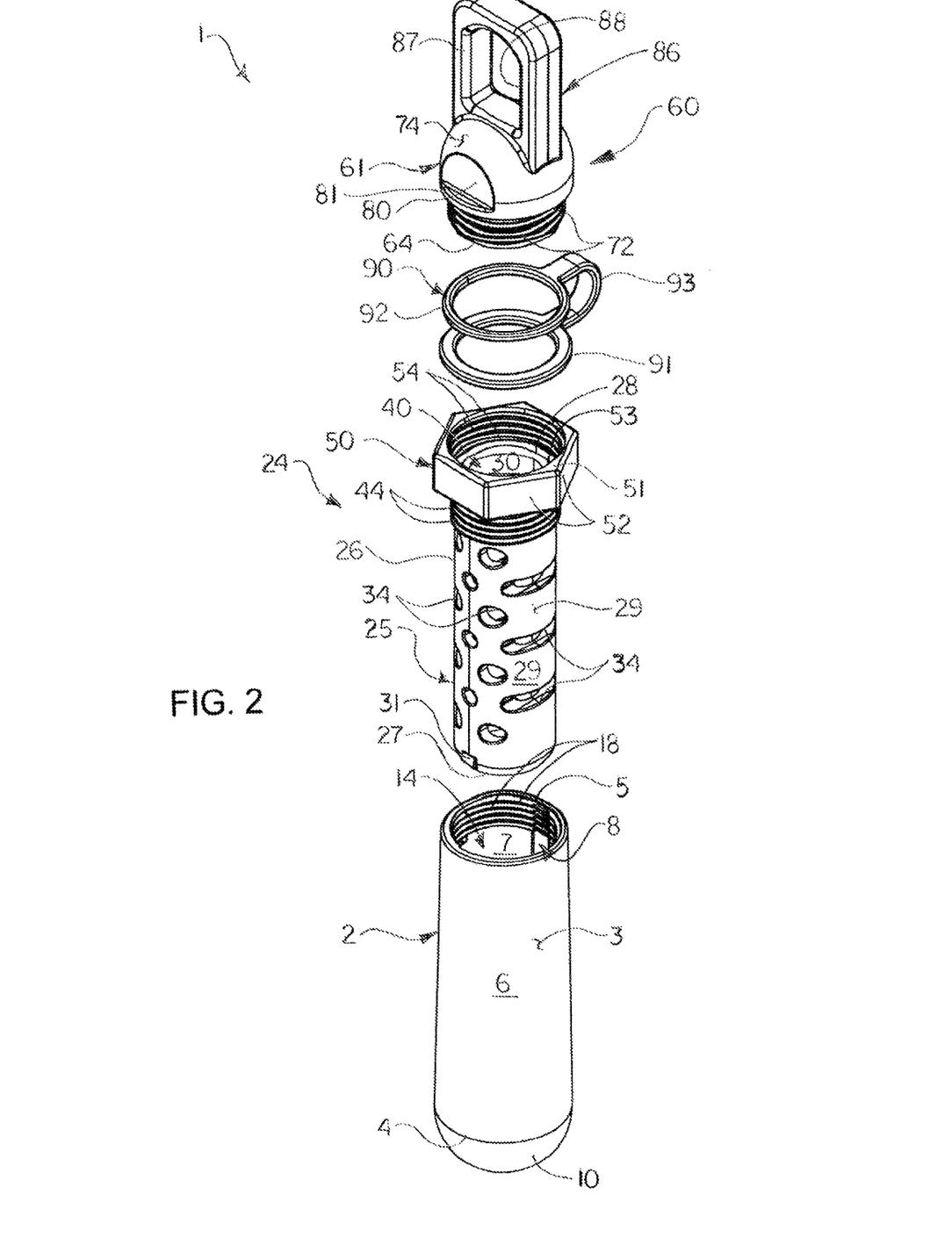
FIG. 2 is an exploded front perspective view of the illustrative scent dispersal assembly illustrated in FIG. 1.
Figure 10:
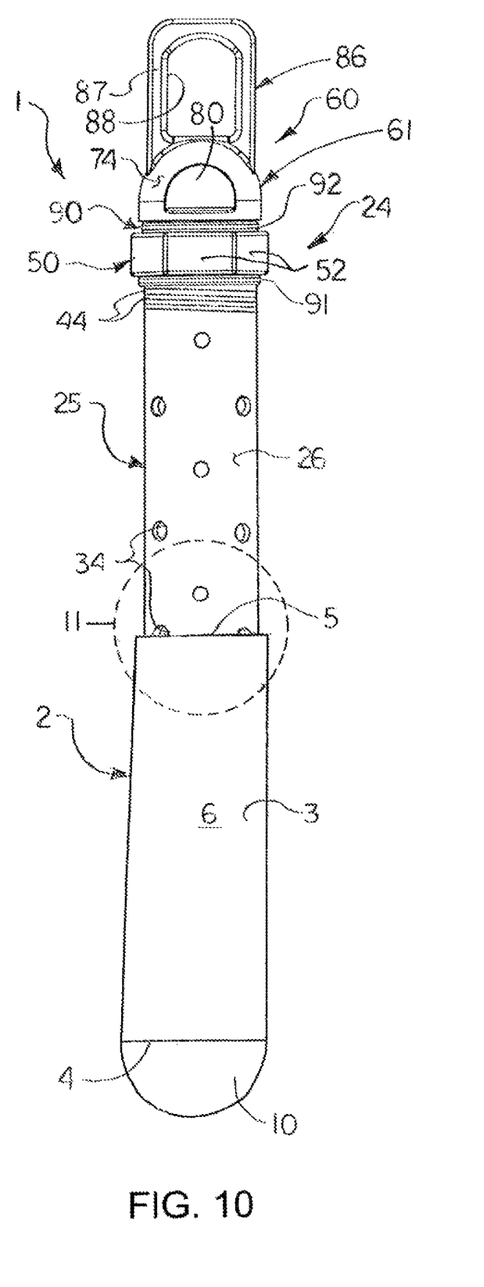
FIG. 10 is a front view of the illustrative scent dispersal assembly, with the scent containing insert deployed in the open, scent-dispensing configuration on the assembly container for use of the assembly.

Referring next to FIGS. 1-11 of the drawings, the scent dispersal assembly 1 may include an assembly container 2. As illustrated in FIGS. 2 and 9, the assembly container 2 may have a container interior 14. A scent containing insert 24 may include a scent receptacle 25. As illustrated in FIGS. 1 and 3-9, the scent receptacle 25 may be selectively deployable in a closed, sealing configuration in the container interior 14 to seal the scent medium 96 in the scent containing insert 24. As illustrated in FIG. 10, the scent receptacle 25 may be selectively extendable from the container interior 14 of the assembly container 2 to an open, scent dispensing-configuration to facilitate emission of the scent or scents from the scent medium 96 to the area around or adjacent to the scent dispersal assembly 1.

The scent receptacle 25 of the scent containing insert 24 may include a scent receptacle interior 40. The scent receptacle interior 40 may be suitably sized and configured to contain at least one scent medium 96 (illustrated in phantom in FIG. 9). At least one scent dispensing aperture 34 may be provided in the scent receptacle 25. The scent dispensing aperture or apertures 34 may communicate with the scent receptacle interior 40 of the scent receptacle 25. In typical application of the scent dispersal assembly 1, which will be hereinafter described, the scent containing insert 24, with the scent medium 96 contained in the scent receptacle interior 40 of the scent receptacle 25, may be deployed from the sealing configuration to the scent dispensing configuration for use. An assembly cap 60 may be deployable in a closed cap position to close and seal the scent receptacle interior 40, as illustrated, and in an open cap position to open the scent receptacle interior 40 of the scent receptacle 25.

A cap hinge 90 may pivotally attach the assembly cap 60 to the scent containing insert 24. The cap hinge 90 may include an insert seal ring 91 which imparts a first airtight seal between the scent containing insert 24 and the assembly container 2 in the closed, sealing configuration of the scent containing insert 24. The cap hinge 90 may include a cap seal ring 92 which imparts a second airtight seal between the assembly cap 60 and the scent containing insert 24 and in the closed cap position of the assembly cap 60. A hinge ring connector 93 may connect the cap seal ring 92 to the insert seal ring 91. The hinge ring connector 93 may facilitate pivoting or hinged movement of the cap seal ring 92 with respect to the insert seal ring 91 of the cap hinge 90 between the open and closed cap positions of the assembly cap 60. In some embodiments, the hinge ring connector 93 may include a flexible material.

The assembly container 2 of the scent dispersal assembly 1 may have a container sidewall 3. As illustrated in FIGS. 2 and 9, the container sidewall 3 may a base end 4, an insert receiving end 5, an exterior wall surface 6, and an interior wall surface 7 which faces the container interior 14. As illustrated in FIG. 9, in some embodiments, at least one tab channel 8, the purpose of which will be hereinafter described, may extend into the interior wall surface 7 of the container sidewall 3. In some embodiments, a pair of spaced-apart tab channels 8 may be disposed in diametrically opposed or 180-degree relationship to each other in the container sidewall 3. Each tab channel 8 may extend from the base end 4 toward the insert receiving end 5 of the container sidewall 3. In some embodiments, each tab channel 8 may terminate adjacent to or at the insert receiving end 5 and may open to the insert receiving end 5.

An assembly container base 10 may close the base end 4 of the container sidewall 3 of the assembly container 2. In some embodiments, the assembly container base 10 may be convex, as illustrated. In other embodiments, the assembly container base 10 may have other profiles such as fat, planar, or concave, for example and without limitation.

In some embodiments, the scent dispensing insert 24 may be configured to threadably engage the assembly container 2 in the sealed configuration of the scent dispensing insert 24. Accordingly, exterior scent receptacle threads 44 may be provided on the scent dispensing insert 24. Companion interior container threads 18 may be provided on the interior wall surface 7 of the container sidewall 3 for threaded engagement with the scent receptacle threads 44, as illustrated in FIG. 9 and will be hereinafter further described. In some embodiments, the container threads 18 may be provided at or adjacent to the insert receiving end 5 of the container sidewall 3, as further illustrated in FIG. 9.

The scent receptacle sidewall 26 of the scent receptacle 25 of the scent containing insert 24 may have an insertion end 27, a scent receiving end 28, an exterior wall surface 29 and an interior wall surface 30. A scent receptacle end wall 38 may close the insertion end 27 of the scent receptacle sidewall 26. At least one insert tab 31 may protrude from the exterior wall surface 29, typically at or adjacent to the base end 4. Each insert tab 31 may extend or insert into the corresponding tab channel 8 in the interior wall surface 7 of the container sidewall 3 of the assembly container 2. The insert tab 31 may traverse the tab channel 8 as the scent containing insert 24 deploys between the sealing configuration and the scent-dispensing configuration in the assembly container 2.

The scent dispensing aperture or apertures 34 in the scent receptacle sidewall 26 of the scent receptacle 25 may have any desired size and shape. For example and without limitation, as illustrated in FIG. 2, in some embodiments, at least a portion of the scent dispensing apertures 34 may be circular. In some embodiments, at least a portion of the scent dispensing apertures 34 may be elongated, elliptical, or slotted. In some embodiments, the scent dispensing apertures 34 may include a combination of both circular and elongated, elliptical, or slotted scent dispensing apertures 34, as illustrated. The circular and slotted scent dispensing apertures 34 may be arranged in any desired pattern in the scent receptacle sidewall 26. The scent dispensing apertures 34 may be arranged around a portion of the scent receptacle sidewall 26 or may be arranged 360 degrees around the circumference of the scent receptacle sidewall 26.

As illustrated in FIG. 9, in some embodiments, at least one centralizer member 32 may be provided in the scent receptacle interior 40 of the scent receptacle 25 of the scent containing insert 24. Multiple centralizer members 32 may be provided in spaced-apart relationship to each other along at least a portion of the length of the scent receptacle sidewall 26. The centralizer members 32 may be configured to centralize the scent medium 96 in the scent receptacle interior 40 of the scent receptacle 25. Each centralizer member 32 may extend from the interior wall surface 30 of the scent receptacle sidewall 26 into the scent receptacle interior 40. In some embodiments, each centralizer member 32 may include an annular ring which protrudes or extends from the interior wall surface 30. The inner edge or surface of the ring may engage the outer surface of the scent medium 96. In other embodiments, each centralizer member 32 may include multiple, discreet fingers or projections which protrude from the interior wall surface 30 into the scent receptacle interior 40, in which case the extending or distal ends of the fingers or projections may engage the scent medium 96.

As illustrated in FIGS. 2 and 9, in some embodiments, the exterior scent receptacle threads 44 may extend from the exterior wall surface 29 of the scent receptacle sidewall 26 of the scent containing insert 25, typically at or adjacent to the scent receiving end 28 of the scent receptacle 25. The scent receptacle threads 44 may be configured to engage the companion interior container threads 18 in the assembly container 2 to secure the scent containing insert 24 in the sealing configuration in the container interior 14 of the assembly container 2.

In some embodiments, an insert head 50 may be provided on the scent receptacle 25 of the scent containing insert 24. The insert head 50 may include an insert head wall 51 which extends outwardly from the scent receiving end 28 of the scent receptacle sidewall 26. Multiple, flat or planar insert head flats 52 may be provided in the exterior surface of the insert head wall 51. The insert head flats 52 may provide manual or digital grip surfaces for a user as the user rotates the insert head 50 to facilitate engagement or disengagement of the scent receptacle threads 44 with the container threads 18.

As illustrated in FIG. 2, an insert head opening 53 may be formed by the insert head wall 51 of the insert head 50. The insert head opening 53 may communicate with the scent receptacle interior 40 of the scent receptacle 25. Accordingly, in placement of the scent medium 96 (FIG. 9) into the scent receptacle 25, the scent medium 96 may be inserted first through the insert head opening 53 in the insert head 50 and then into the scent receptacle interior 40. In some embodiments, interior insert head threads 54 may extend from the insert head wall 51 into the insert head opening 53 of the insert head 50 for purposes which will be hereinafter described.

The assembly cap 60 may be configured to detachably engage the scent containing insert 24 and reversibly close and seal the scent receptacle interior 40 of the scent receptacle 25 of the scent containing insert 24. Accordingly, in some embodiments, the assembly cap 60 may include an assembly cap base 61. As illustrated in FIG. 9, the assembly cap base 61 may have a cap attachment wall portion 63 configured to detachably engage the insert head 50 of the scent containing insert 24. The cap attachment wall portion 63 may have a cap insertion end 64, a cap shoulder end 65, an exterior cap wall surface 68 and an interior cap wall surface 69. In some embodiments, the cap attachment wall portion 63 of the assembly cap base 61 may threadably engage the insert head wall 51 of the insert head 50. Exterior cap threads 72 may extend from the exterior cap wall surface 68 of the cap attachment wall portion 63. The cap threads 72 may be configured to threadably engage the companion interior insert head threads 54 in the insert head 50 in the closed cap position of the assembly cap 60 on the scent containing insert 24.

Figure 3:
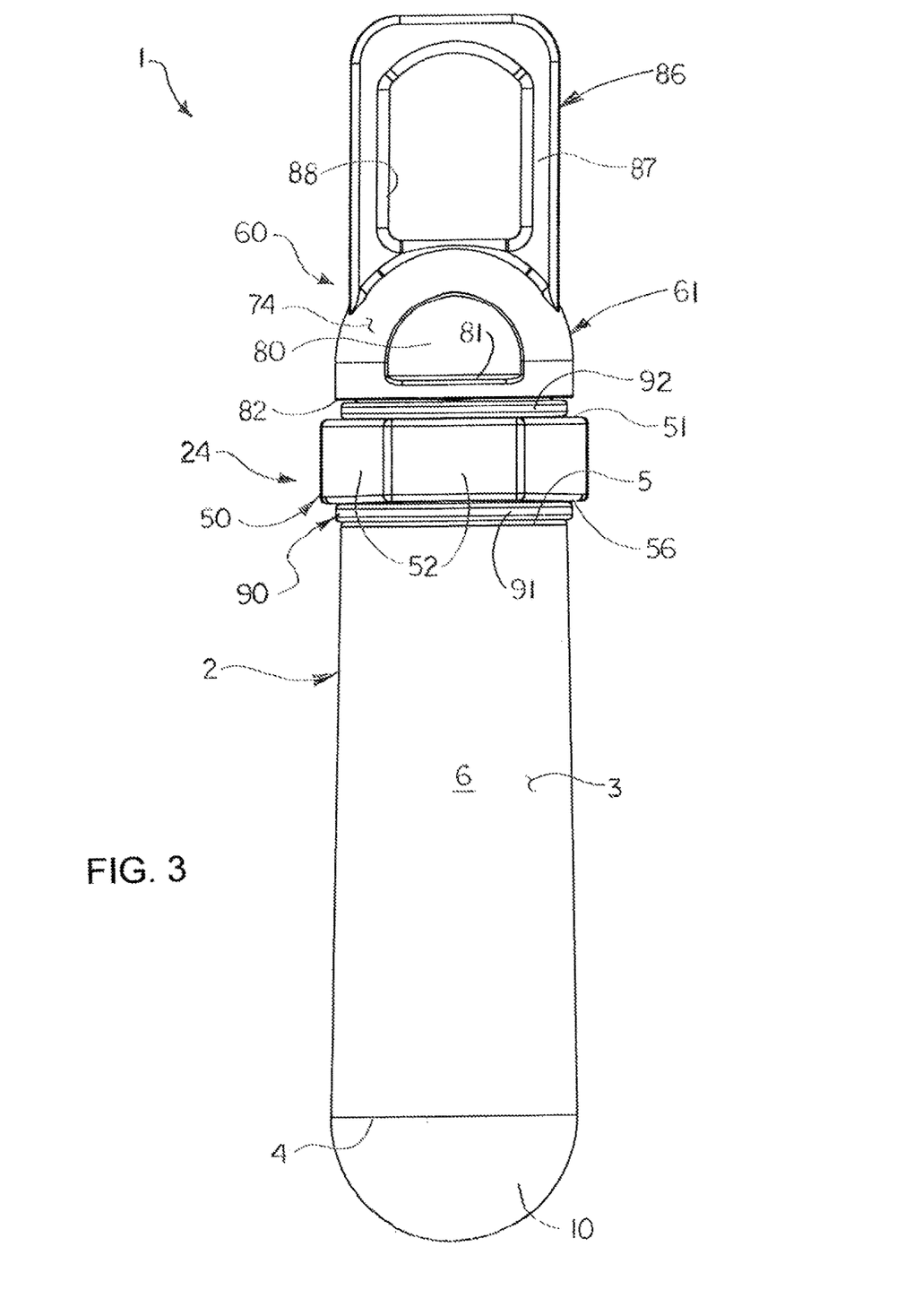
FIG. 3 is a front view of the illustrative scent dispersal assembly in the closed, sealing configuration and the closed cap position.
Figure 4:
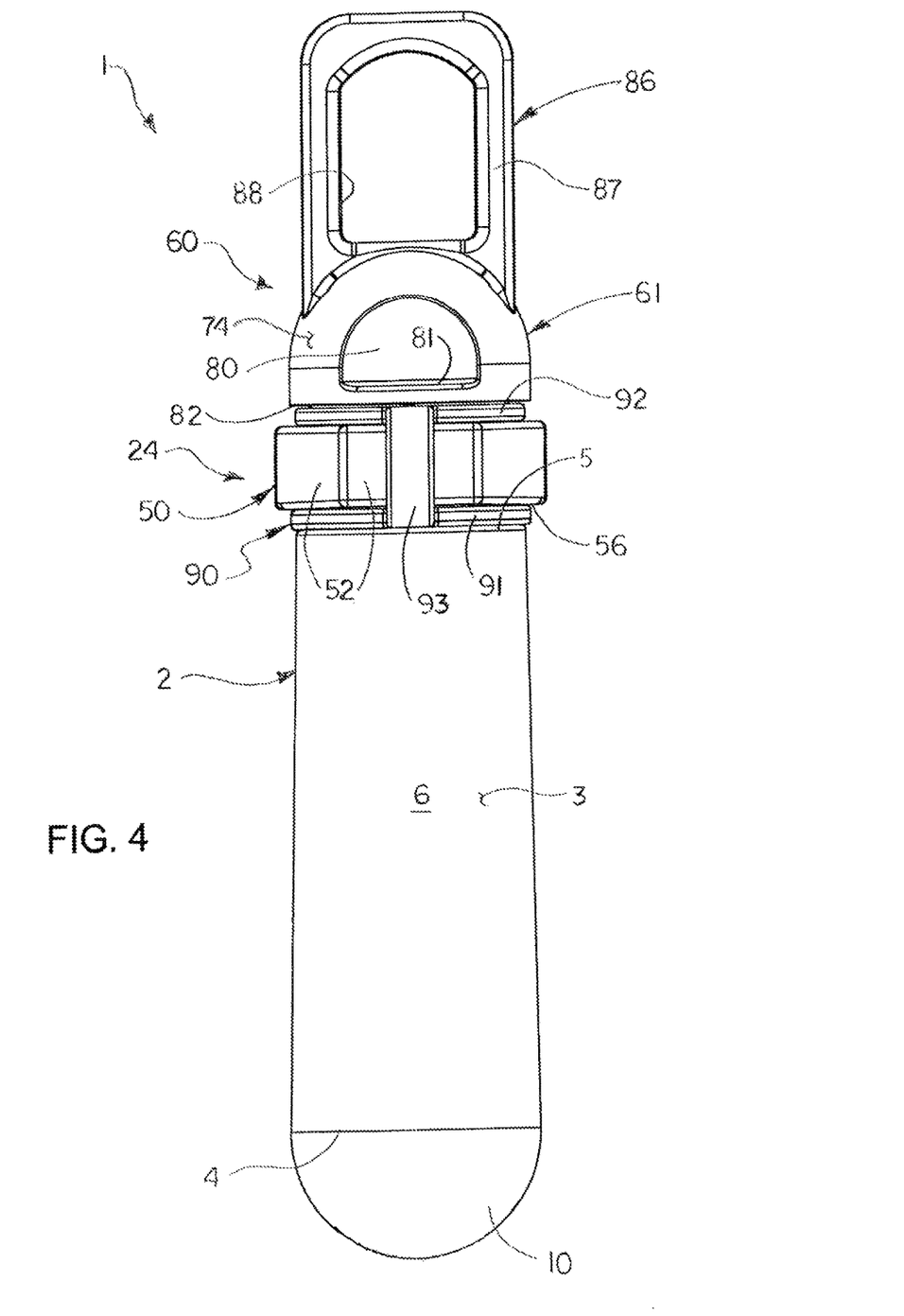
FIG. 4 is a rear view of the illustrative scent dispersal assembly.
Figure 5:
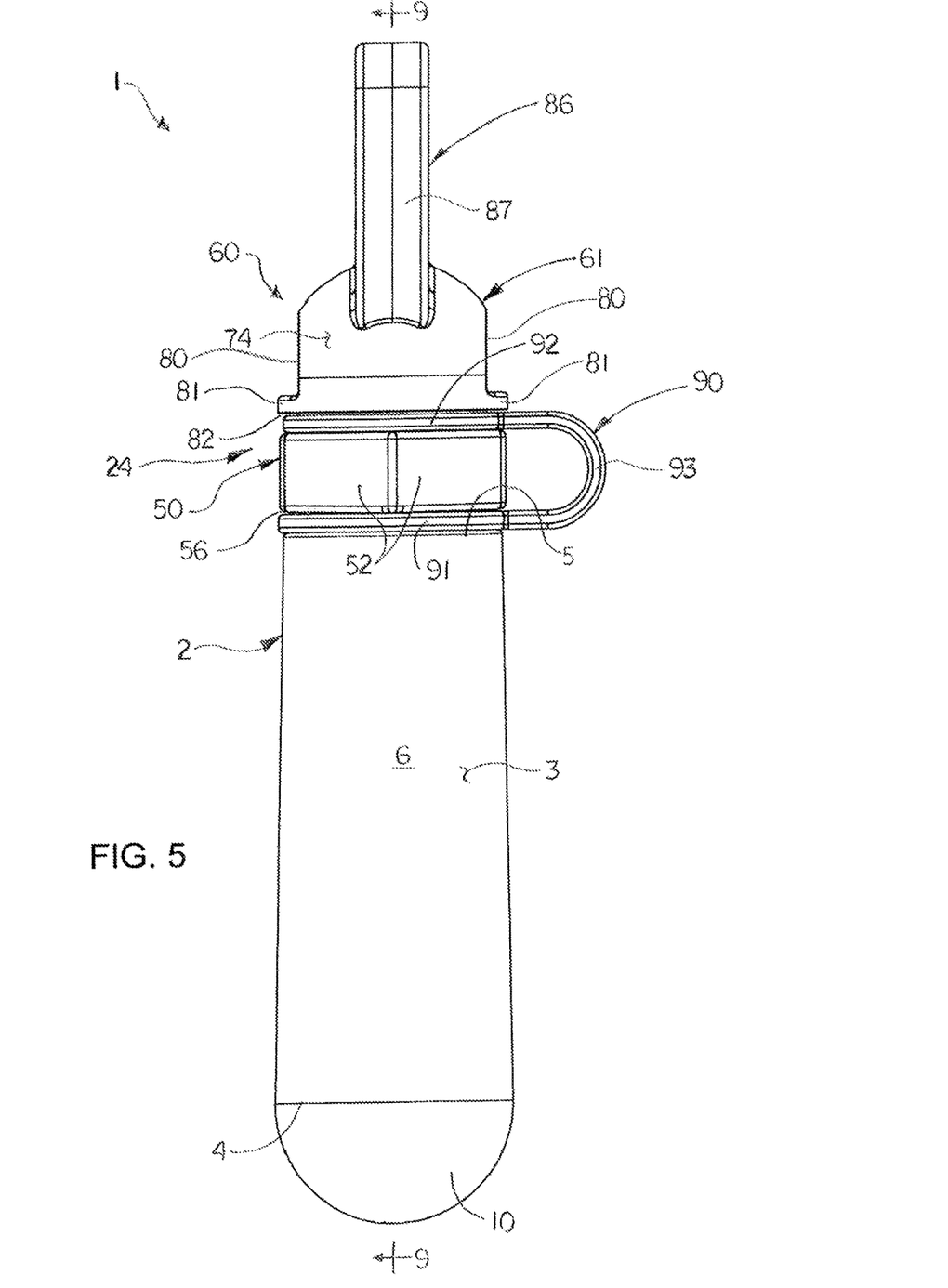
FIG. 5 is a left-side view of the illustrative scent dispersal assembly.
Figure 6:
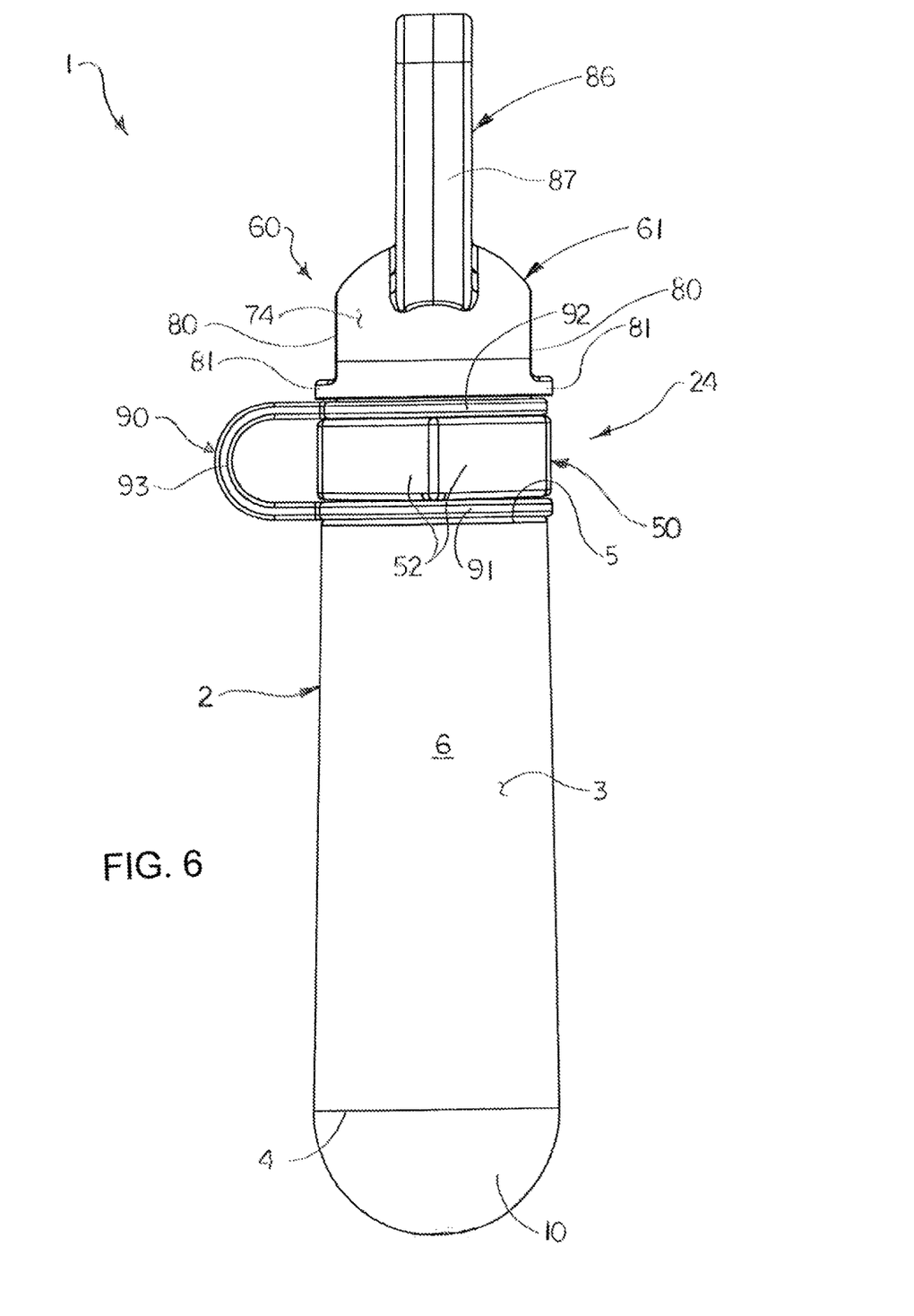
FIG. 6 is a right-side view of the illustrative scent dispersal assembly.
Figure 7:
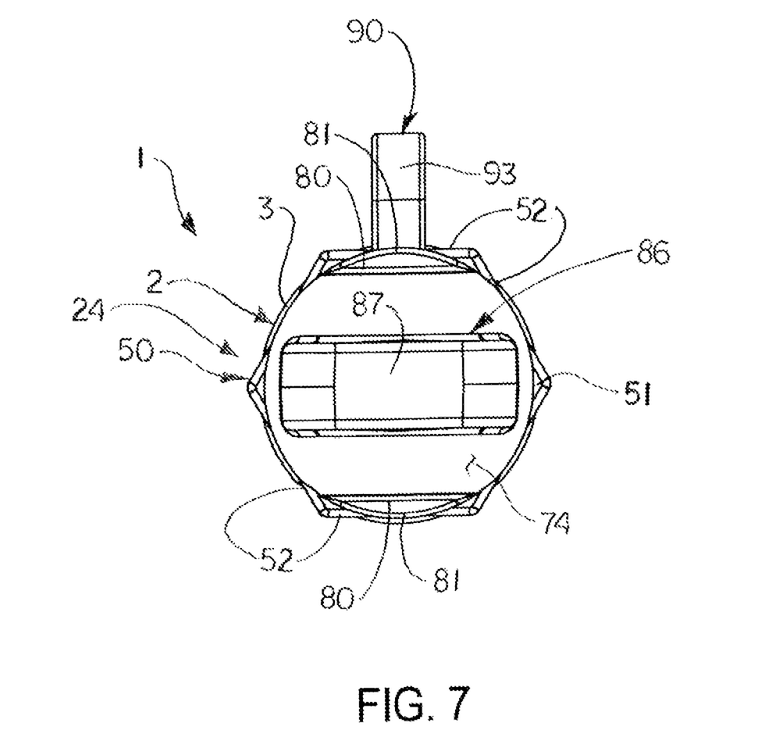
FIG. 7 is a top view of the illustrative scent dispersal assembly.
Figure 8:
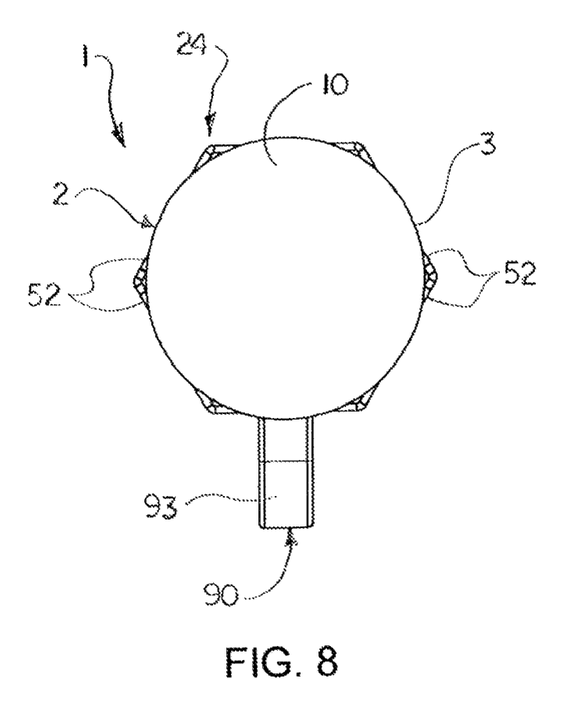
FIG. 8 is a bottom view of the illustrative scent dispersal assembly.

As further illustrated in FIG. 9, a shoulder wall portion 70 may extend outwardly from the cap shoulder end 65 of the cap attachment wall portion 63 of the assembly cap base 61. A main cap wall portion 74 may extend from the shoulder wall portion 70. The main cap wall portion 74 may be convex or dome shaped. As illustrated in FIGS. 3 and 4, at least one flat or planar cap depression 80 may be provided in the exterior surface of the main cap wall portion 74. A cap flange 81 may protrude from a lower edge of the cap depression 80. Accordingly, the cap depressions 80 and the cap flanges 81 may provide manual or digital grip surfaces for a user as the user rotates the assembly cap base 61 of the assembly cap 60 to facilitate engagement or disengagement of the cap threads 72 with the insert head threads 54.

In some embodiments, the assembly cap 60 may include at least one assembly hanging hook 86. The assembly hanging hook 86 may include a hook wall 87 which extends from the exterior surface of the main cap wall portion 74 of the assembly cap base 61. A hook opening 88 may extend through the hook wall 87. In typical application, which will be hereinafter further described, the assembly hanging hook 86 may facilitate suspension of the scent dispersal assembly 1 from the limb 101 of the tree 100 (FIG. 12), or other element of the support for the scent dispersal assembly 1.

In some embodiments, the insert seal ring 91, the cap seal ring 92, and the hinge ring connector 93 of the cap hinge 90 may be fabricated of rubber, silicone, plastic, and/or other resilient, elastomeric, or flexible material. As illustrated in FIG. 9, the insert seal ring 91 of the cap hinge 90 may encircle the scent receptacle sidewall 26 of the scent receptacle 25 of the scent containing insert 24 at the insert receiving end 5. The cap seal ring 92 of the cap hinge 90 may encircle the cap attachment wall portion 63 of the assembly cap base 61 of the assembly cap 60 at the cap shoulder end 65 and typically beneath or adjacent to the shoulder wall portion 70 of the assembly cap base 61. Accordingly, when the scent containing insert 24 is deployed in the sealing configuration on the assembly container 2, as illustrated in FIG. 9, the insert seal ring 91 may be configured to engage the open insert receiving end 5 of the assembly container sidewall 3 to impart an airtight seal between the container sidewall 3 of the assembly container 2 and the scent receptacle sidewall 26 of the scent receptacle 25. When the assembly cap 60 is in the closed cap position on the scent containing insert 24, the cap seal ring 92 may impart an airtight seal between the insert head wall 51 of the insert head 50 and the cap attachment wall portion 63 of the assembly cap 60. The cap hinge 90 may maintain attachment of the assembly cap 60 to the scent containing insert 24 as the assembly cap 60 is removed from the insert head 50 to open the scent receptacle interior 40 of the scent receptacle 25, typically to facilitate placement of the scent medium 96 in and removal of the scent medium 96 from the scent receptacle interior 40.

In typical application, the scent dispersal assembly 1 may be suspended from a limb 101 of a tree 100, as illustrated in FIG. 12, or from any other suitable support to dispense scent which attracts game animals 108 to the area around the scent dispersal assembly 1. Accordingly, the assembly cap 60 may initially be removed from the scent containing insert 24. This may be accomplished by disengagement of the cap threads 72 from the insert head threads 54 by rotating the assembly cap 60 typically in the counterclockwise direction. After detachment of the assembly cap 60 from the insert head 50, the cap hinge 90 may maintain connection between the assembly cap 60 and the scent containing insert 24 and allow the assembly cap 60 to drop back and hang adjacent to the scent containing insert 24.

At least one scent medium 96 (FIG. 9) may be inserted through the insert head opening 53 of the insert head 50 and into the scent receptacle interior 40 of the scent receptacle 25. In some applications, the scent medium 96 may include at least one scent stick known by those skilled in the art. Accordingly, as illustrated in FIG. 9, the centralizer members 32 may centralize the scent medium 96 in the center of the scent receptacle interior 40. In some applications, the scent medium 96 may include scent beads or felt and/or cotton wicks, for example and without limitation, or any combination of different types of scent media 96.

After placement of the scent medium 96 in the scent receptacle interior 40, the assembly cap 60 may be returned to the closed cap position on the insert head 50. The assembly cap 60 may seal the scent receptacle interior 40 to prevent the scent which emanates from the scent medium 96 from escaping from the scent receptacle interior 40 during storage and/or transport of the scent dispersal assembly 1 to the site of use. The insert seal ring 91 of the cap hinge 90 may seal the interface between the scent receptacle sidewall 26 of the scent receptacle 25 and the cap seal ring 92 of the cap hinge 90 may seal the interface between the scent receptacle sidewall 26 and the insert head wall 51 of the insert head 50 to maintain freshness of the scent medium 96 as the scent medium 96 remains in the scent receptacle interior 40.

Figure 11:
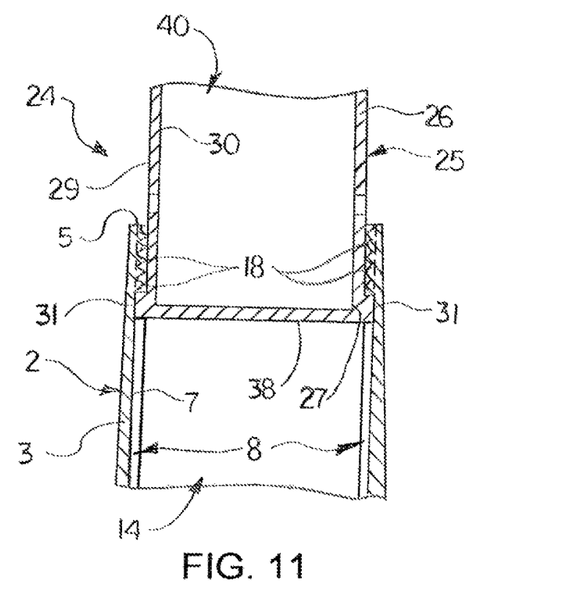
FIG. 11 is an enlarged sectional view, taken at section line 11 in FIG. 10, of the scent containing insert in the open configuration on the assembly container of the scent dispersal assembly.

At the site of deployment, the scent containing insert 24 may be deployed from the closed, sealing configuration to the open, scent-dispensing configuration typically by disengagement of the exterior scent receptacle threads 44 on the scent receptacle 25 from the companion interior container threads 18 in the assembly container 2. As the insert tabs 31 on the scent receptacle 25 traverse the respective tab channels 8 in the assembly container 2, the scent containing insert 24 may deploy to the extended, scent-dispensing configuration illustrated in FIG. 10. As illustrated in FIG. 11, at the fully extended and deployed scent-dispensing configuration of the scent containing insert 24, the insert tabs 31 on the scent receptacle 25 may limit extension of the scent receptacle 25 from the assembly container 2 typically by engaging the container threads 18. This expedient may prevent or hinder complete removal of the scent receptacle 25 from the assembly container 2. In some embodiments, however, the tab channels 8 may traverse the container threads 18, as indicated in phantom in FIG. 11. This may enable complete removal of the scent receptacle 25 from the assembly container 2 upon application of sufficient pulling force of the scent receptacle 25 away from the assembly container 2. The removed scent receptacle 25 may be replaced in the assembly container 2 by pushing the insertion end 27 having the insert tabs 31 into the assembly container 2 with sufficient force to overcome the resistance imparted by the container threads 18.

The scent dispersal assembly 1 may be suspended from the limb 101 of the tree 1(0 or other support typically by attaching a suspension member 104 to the assembly cap 60 and to the limb 101. The suspension member 104 may include a chain, cable, rope, clevis or any other element, device, or combination of elements or devices suitable for the purpose. Game-attracting scents may emanate from the scent medium 96 into the scent receptacle interior 40 of the scent receptacle 25 and waft to the area around the scent dispersal assembly 1 to attract game animals 108 to the scent dispersal assembly 1 for hunting, observation, or other purposes.

When use is completed, the scent dispersal assembly 1 may be removed from the tree limb 101 or other support. The scent receptacle 25 of the scent containing insert 24 may be deployed back to the sealing configuration and secured typically by engagement of the scent receptacle threads 44 with the container threads 18. The scent medium 96 can be removed from the scent receptacle interior 40 for replacement by removal of the assembly cap 60 from the insert head 50 of the scent containing insert 24, typically by disengagement of the cap threads 72 from the companion insert head threads 54, thus exposing the scent receptacle interior 40 through the insert head opening 53 of the insert head 50.

It will be appreciated by those skilled in the art that the scent dispersal assembly 1 is versatile, durable, and capable of containing a variety of scent media 96 suitable for attracting game animals 108. The design of the assembly cap 60 facilitates suspension of the scent dispersal assembly 1 from the tree limb 101 or any other suitable support. The typically double O-ring design of the cap hinge 90 may allow for no-mess filling of the scent receptacle interior 40 with the scent medium 96 and prevent leaking of the scent medium 96 or the game attracting scent emanating from the scent medium 96 when the scent containing insert 24 is in the sealing configuration in the assembly container 2 and the assembly cap 60 is in the closed cap position on the scent containing insert 24. The design of the scent dispersal assembly 1 may facilitate 360-degree scent dispersant and enable the user of the scent dispersal assembly 1 to place the desired RAA deer lure, flavored scent, and/or other scent medium 96 in the scent receptacle interior 40 spill-free and facilitates ease of replacement of felt and/or cotton wicks as the scent medium 96. The assembly container 2, scent containing insert 24, assembly cap 60, and other components of the scent dispersal assembly 1 may be fabricated of plastic, rubber, metal, and/or other suitable materials using molding, casting, and other fabrication techniques known by those skilled in the art.

While the preferred embodiments of the invention have been described above, it will be recognized and understood that various modifications may be made in the invention and the appended claims are intended to cover all such modifications which may fall within the spirit and scope of the invention.

What is claimed is:

1. A scent dispersal assembly, comprising:
an assembly container having a container interior;
a scent containing insert comprising:
  a scent receptacle selectively deployable in a closed, sealing configuration in the container interior and extendable from the container interior of the assembly container to an open, scent dispensing-configuration, the scent receptacle comprising:
    a scent receptacle interior suitably sized and configured to contain at least one scent medium; and
    at least one scent dispensing aperture in the scent receptacle, the at least one scent dispensing aperture communicating with the scent receptacle interior;
an assembly cap deployable in a closed cap position to close and seal the scent receptacle interior and an open cap position to open the scent receptacle interior of the scent receptacle; and
a cap hinge pivotally attaching the assembly cap to the scent containing insert, the cap hinge comprising:
  an insert seal ring imparting a first airtight seal between the scent containing insert and the assembly container in the closed, sealing configuration of the scent containing insert;
  a cap seal ring imparting a second airtight seal between the assembly cap and the scent containing insert in the closed cap position of the assembly cap; and
  a hinge ring connector connecting the cap seal ring to the insert seal ring.

2. The scent dispersal assembly of claim 1 further comprising an insert head on the scent receptacle of the scent containing insert.

3. The scent dispersal assembly of claim 2 further comprising a plurality of insert head flats on the insert head.

4. The scent dispersal assembly of claim 1 wherein the scent containing insert threadably engages the assembly container in the sealing configuration.

5. The scent dispersal assembly of claim 1 wherein the assembly cap threadably engages the scent containing insert in the closed cap position.

6. The scent dispersal assembly of claim 1 further comprising at least one centralizer member in the scent receptacle interior of the scent receptacle of the scent containing insert.

7. The scent dispersal assembly of claim 6 wherein the at least one centralizer member comprises at least one centralizer ring.

8. The scent dispersal assembly of claim 1 wherein the hinge ring connector of the cap hinge comprises a flexible material.

9. A scent dispersal assembly, comprising:
an assembly container comprising:
an assembly container sidewall having a closed base end and an open insert receiving end; and
a container interior formed by the assembly container sidewall;
a scent containing insert comprising:
a scent receptacle selectively deployable in a closed, sealing configuration in the container interior and extendable from the container interior of the assembly container to an open, scent dispensing configuration, the scent receptacle comprising:
an elongated scent receptacle sidewall having an insertion end and an open scent receiving end, the insertion end inserted in the open insert receiving end of the assembly container;
a scent receptacle interior formed by the scent receptacle sidewall, the scent receptacle interior communicating with the scent receiving end of the scent receptacle sidewall and suitably sized and configured to contain at least one scent medium: and
at least one scent dispensing aperture in the scent receptacle sidewall, the at least one scent dispensing aperture communicating with the scent receptacle interior;
an assembly cap deployable in a closed cap position to removably engage the scent containing insert and close and seal the scent receptacle interior and an open cap position to open the scent receptacle interior of the scent receptacle; and
a cap hinge pivotally attaching the assembly cap to the scent containing insert, the cap hinge comprising:
an insert seal ring encircling the scent receptacle sidewall of the scent receptacle of the scent containing insert, the insert seal ring configured to engage the open insert receiving end of the assembly container sidewall of the assembly container and impart a first airtight seal between the scent containing insert and the assembly container in the closed, scaling configuration of the scent containing insert:
a cap seal ring encircling the assembly cap, the cap seal ring configured to impart a second airtight seal between the assembly cap and the scent containing insert in the closed cap position of the assembly cap; and
a hinge ring connector pivotally connecting the cap seal ring to the insert seal ring.

10. The scent dispersal assembly of claim 9 further comprising an insert head on the scent receptacle of the scent containing insert.

11. The scent dispersal assembly of claim 10 further comprising a plurality of insert head flats on the insert head.

12. The scent dispersal assembly of claim 9 wherein the scent containing insert threadably engages the assembly container in the sealing configuration.

13. The scent dispersal assembly of claim 9 wherein the assembly cap threadably engages the scent containing insert in the closed cap position.

14. The scent dispersal assembly of claim 9 further comprising at least one centralizer member in the scent receptacle interior of the scent receptacle of the scent containing insert.

15. The scent dispersal assembly of claim 14 wherein the at least one centralizer member comprises at least one centralizer ring.

16. The scent dispersal assembly of claim 9 wherein the hinge ring connector of the cap hinge comprises a flexible material.

17. A scent dispersal assembly, comprising:
an assembly container comprising:
an elongated assembly container sidewall having a base end, an open insert receiving end and an assembly container base closing the base end;
a container interior formed by the assembly container sidewall and the assembly container base;
at least one interior tab channel in the assembly container sidewall in the container interior of the assembly container; and
at least one interior container thread on the assembly container sidewall in the container interior at the insert receiving end;
a scent containing insert comprising:
a scent receptacle selectively deployable in a closed, sealing configuration in the container interior and extendable from the container interior of the assembly container to an open, scent dispensing configuration, the scent receptacle comprising:
an elongated, cylindrical scent receptacle sidewall having a closed insertion end and an open scent receiving end, the insertion end inserted in the open insert receiving end of the assembly container;
at least one exterior insert tab extending from the scent receptacle sidewall, the at least one exterior insert tab slidably interfacing with the at least one interior tab channel, respectively, in the assembly container sidewall of the assembly container;
a scent receptacle interior formed by the scent receptacle sidewall, the scent receptacle interior communicating with the open scent receiving end of the scent receptacle sidewall and suitably sized and configured to contain at least one scent medium;
a plurality of scent dispensing apertures in the scent receptacle sidewall, the plurality of scent dispensing apertures arranged 360 degrees around the scent receptacle sidewall and communicating with the scent receptacle interior;
at least one exterior scent receptacle thread on the scent receptacle sidewall at the scent receiving end, the at least one exterior scent receptacle thread configured to engage the at least one container thread in the container interior of the assembly container in the sealing configuration and disengage the at least one container thread in the scent dispensing configuration of the scent containing insert;
an insert head on the scent receptacle at the scent receiving end of the scent receptacle sidewall, the insert head having an insert head opening communicating with the scent receptacle interior of the scent receptacle; and
at least one interior insert head thread in the insert head opening of the insert head;

an assembly cap deployable in a closed cap position to removably engage the scent containing insert and close and seal the scent receptacle interior and an open cap position to open the scent receptacle interior of the scent receptacle, the assembly cap comprising:
an assembly cap base; and
at least one exterior cap thread on the assembly cap base, the at least one exterior cap thread removably engaging the at least one insert head thread in the insert head of the scent containing insert to close and seal the scent receptacle interior of the scent receptacle in the closed cap position; and
a cap hinge pivotally attaching the assembly cap to the scent containing insert, the cap hinge comprising:
an insert seal ring encircling the scent receptacle sidewall of the scent receptacle of the scent containing insert, the insert seal ring configured to engage the open insert receiving end of the assembly container and impart a first airtight seal between the assembly container and the scent containing insert in the closed, sealing configuration of the scent containing insert;
a cap seal ring encircling the assembly cap, the cap seal ring configured to impart a second airtight seal between the scent containing insert and the assembly cap in the closed cap position of the assembly cap; and
a flexible hinge ring connector pivotally connecting the cap seal ring to the insert seal ring.

18. The scent dispersal assembly of claim 17 further comprising a plurality of insert head flats on the insert head.

19. The scent dispersal assembly of claim 17 wherein the assembly cap comprises at least one assembly hanging hook.

20. The scent dispersal assembly of claim 17 further comprising at least one centralizer member in the scent receptacle interior of the scent receptacle of the scent containing insert.

* * * * *